United States Patent [19]
LaVallee et al.

[11] Patent Number: 5,181,236
[45] Date of Patent: Jan. 19, 1993

[54] AUTOMATIC CALL RETURNING METHOD FOR CALL DISTRIBUTOR WITH MESSAGE RECORD CAPABILITY

[75] Inventors: James R. LaVallee; Jerry M. Hilsenbeck, both of Naperville; James G. Brown, Lombard; Roger A. Sumner, Batavia; Andre C. Zazzera, St. Charles; Dana A. Bailey, Aurora, all of Ill.

[73] Assignee: Rockwell International Corporation, El Segundo, Calif.

[21] Appl. No.: 587,878

[22] Filed: Sep. 25, 1990

[51] Int. Cl.$^5$ .................. H04M 1/64; H04M 15/06; H04M 3/42; H04Q 3/64
[52] U.S. Cl. .................. 379/67; 379/89; 379/142; 379/216; 379/266
[58] Field of Search ............ 379/67, 266, 265, 309, 379/88, 89, 70, 84, 216, 355, 142

[56] References Cited

U.S. PATENT DOCUMENTS

| | | | |
|---|---|---|---|
| 4,652,700 | 3/1987 | Matthews et al. | 379/89 |
| 4,696,028 | 9/1987 | Morganstein et al. | 379/88 |
| 4,788,715 | 11/1988 | Lee | 379/84 |
| 4,800,583 | 1/1989 | Theis | 379/67 |
| 4,881,261 | 11/1989 | Oliphant et al. | 379/215 |
| 4,896,345 | 1/1990 | Thorne | 379/67 |
| 4,972,461 | 11/1990 | Brown et al. | 379/67 |

*Primary Examiner*—James L. Dwyer
*Assistant Examiner*—Harry S. Hong
*Attorney, Agent, or Firm*—C. B. Patti; V. L. Sewell; Hamann, H. F.

[57] ABSTRACT

A method of automatically returning calls to callers (18) who have recorded a message in an ACD mail (22C) controlled message bin (22D) of a voice response unit (22) in response to a stored announcement in an announcement table (22B) selected in accordance with call statistics in a statistics table (22A) from an automatic call distributor (12) to provide the caller with queue information when no agent stations (14) are available. In one mode of operation (FIG. 4), the recorded voice message in queue is automatically provided to an agent when one becomes available in the same manner as an incoming call except an indication is given to the agent station (14) that the incoming call is, in fact, a prerecorded message which requires a cell back. The agent must obtain the telephone number from the recorded voice message and then input the multidigit number to place a return call. In other modes of operation (FIGS. 5 and 6), DTMF tones (D) recorded with the voice message are employed to enable the agent to auto dial the return call in response to the recorded message. In one of these other modes of operation (FIG. 6), the calls are automatically placed by an ACD control computer (20) and connected to an available agent station (14) the same as an original incoming call when answer detection occurs. If no answer detection occurs within a predetermined time limit, then the recorded message is returned to the queue on a preselected priority basis, and after a preselected number of unsuccessful attempts, the number and related information is printed on a printer (32) and removed from storage in the message bin (22D).

24 Claims, 4 Drawing Sheets

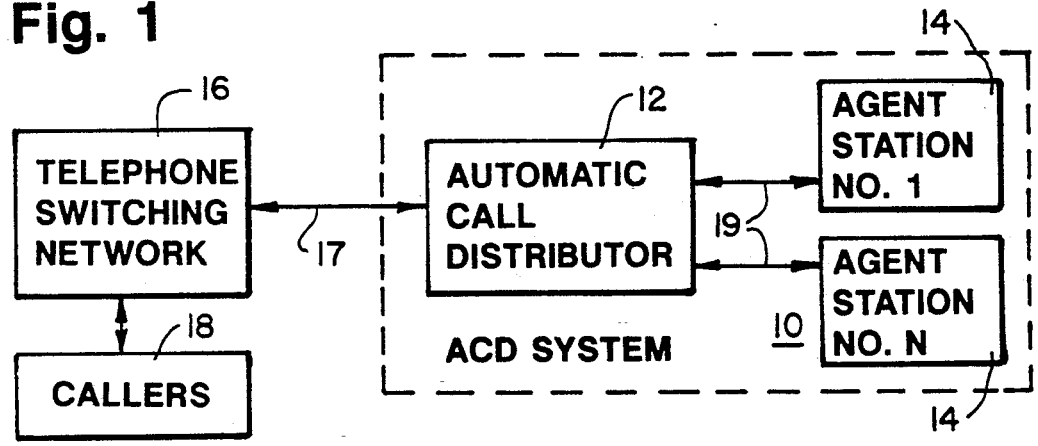
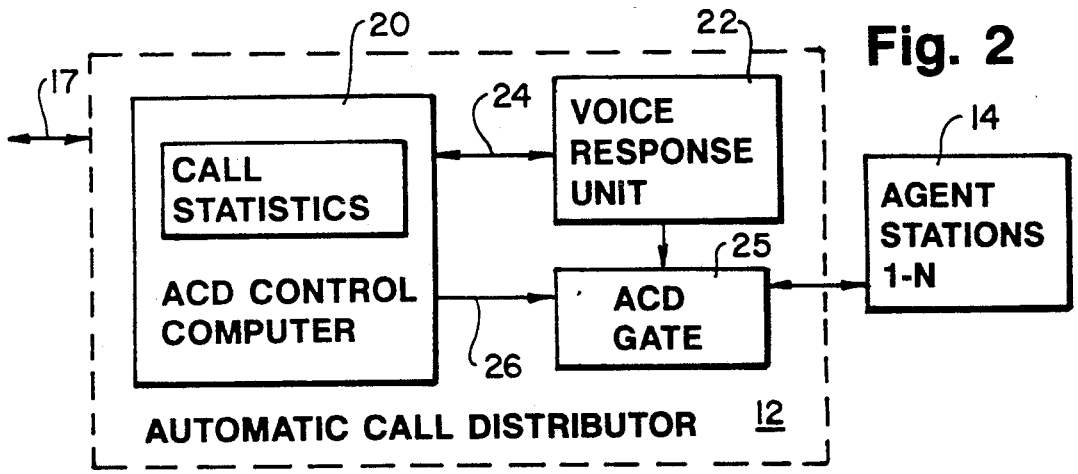
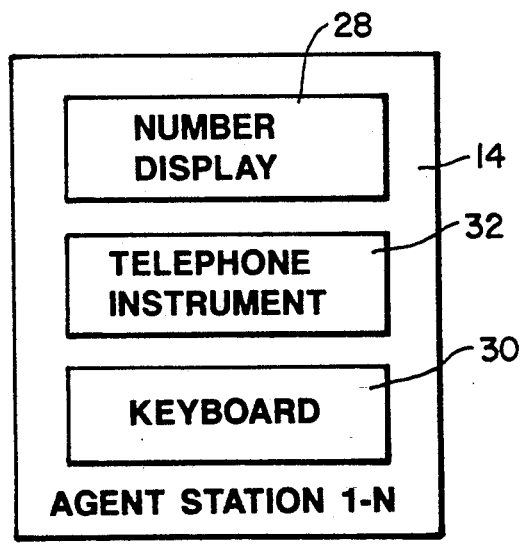

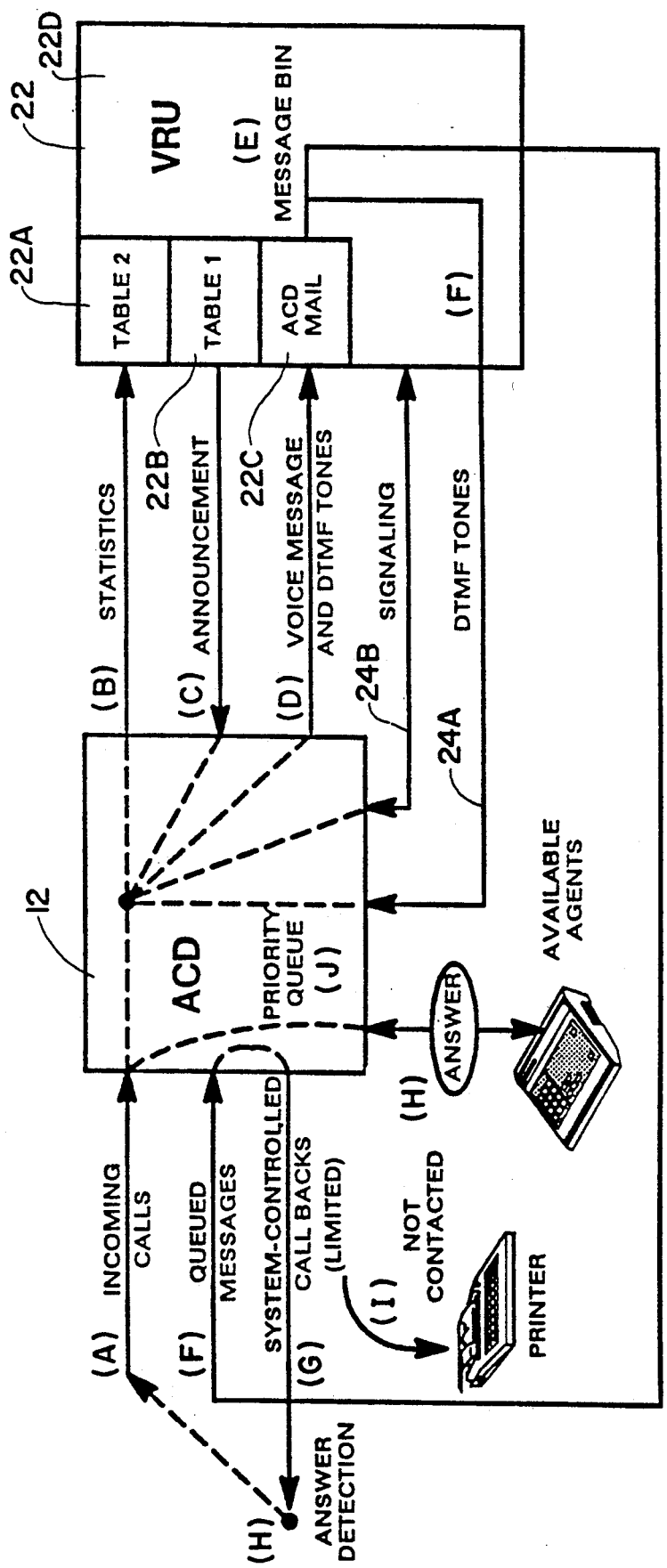

AUTOMATIC CALL RETURNING METHOD FOR CALL DISTRIBUTOR WITH MESSAGE RECORD CAPABILITY

BACKGROUND OF THE INVENTION

This invention relates generally to a telephonic call distributor system with message recording capability and specifically to a method of automatically returning calls to callers who have recorded a message in such a call distributor system.

Call distributor systems are well known as shown by a review of U.S. Pat. Nos. 4,788,715 issued Nov. 19, 1988 to Lee and 4,800,583 issued Jul. 14, 1989 to Theis. Other similar systems are also shown in U.S. Pat. Nos. 4,696,028 issued Sep. 22, 1987 to Morgenstein et al. and 4,809,321 issued Feb. 28, 1989 to Morgenstein et al. and 4,850,012 issued Jul. 18, 1989 to Mehta et al.

In U.S. Pat. No. 4,788,715 of Lee an automatic call distributor is shown in which customers are given an option to leave a message such as a telephone number if they do not wish to wait in queue after having been informed of the expected waiting time prior to connection to an agent, but no provision is made for systematically returning calls to callers who have left a message.

In U.S. Pat. No. 4,800,583 of Theis, overflow calls are automatically diverted to an overflow center which automatically answers the overflow calls and records messages which are manually converted to a digital form by transcribers and then transmitted in digital form back to the telephone answering center. While this approach provides a system for returning calls, because it is not completely automated, it is labor cost intensive, relatively slow in response time and prone to human error.

In U.S. Pat. No. 4,881,261 of Oliphant et al. an automatic call placing function is provided in conjunction with an automatic call distribution system known as Galaxy ACD System manufactured by Rockwell International Corporation. However, this function operates off a data base of known parties to call and does not provide means for automatically responding to recorded messages from incoming calls or to automatically return calls to parties who left recorded messages.

The other patents noted above also provide systems which interact with an incoming caller and respond to queues to assist in completion of the calls, but again there is no means for automatically returning calls to callers who have left a message or simply hang up after waiting in a queue.

SUMMARY OF THE INVENTION

Accordingly, it is the object of the present invention to provide a method of automatically returning calls to callers who have recorded a message which overcomes the disadvantages of known systems noted above in a switching system having an automatic call distributor for selectively switching incoming calls from callers to a group of agent stations and with means for recording messages from the callers in the event a selected group of agent stations is not available to receive the incoming calls.

The method of returning calls of the present invention comprises the steps of indicating to the automatic call distributor when an agent is available to receive a recorded message, automatically connecting through the automatic call distributor, as an incoming call, a recorded message to the agent station indicated as available to receive a recorded message, enabling an agent to transcribe the recorded message at the user selectable agent station and providing the telephone number of the caller who left the recorded message to the agent to facilitate a return call.

It is also an object to provide the above method with the additional step of erasing the message automatically in response to initiation of a return call by the agent to the caller who recorded the message.

Another object is to provide the above method in which the recorded messages are automatically placed in a queue and including the additional steps of automatically connecting a call from a subsequent caller in the queue in response to said step of automatically erasing a prior message in the queue.

Still another object is to provide the above method with the additional step of automatically erasing the recorded message in response to actuation of a single keystroke of a key pad provided at the agent station to generate a preselected dual-tone signal.

A further object is to provide the above method with the step of enabling the agent station to receive the recorded message including the additional steps of indicating to the agent station that a recorded message is available for transcription by the agent and automatically transmitting the message to the agent in response to generation of a password unique to the agent.

Yet another object is to provide the above method in which said system has means for determining the caller's number from DTMF keypad inputs from the caller and recorded with the message and said step of providing includes the additional steps of obtaining the telephone number of the recorded DTMF keypad entries recorded with the message and displaying the obtained number at the agent station when the associated recorded message is automatically connected to the agent station.

Yet a further object is to provide the above method in which said call switching system has means for automatically identifying the number of callers and said step of providing includes the additional steps of recording the number determined by the automatic number identifying means for the recorded message, obtaining the telephone number of the recorded message determined by the automatic number identifying means and displaying the obtained telephone number at the agent station when the associated recorded message is automatically connected to the agent station.

It is also another object to provide the above method with the additional steps of establishing a preselected limit on the number of attempted return calls from the agent stations to a given caller who left a return message and preventing performance of said step of automatically connecting a recorded message to the agent station when said preselected limit is reached.

Moreover, it is an object to provide the above method in which said step of automatically connecting selectively includes the additional user selected steps of loading all the recorded messages in a memory in a queue for creating a return call campaign, placing a return call to each caller who left a recorded message in a preselected order, detecting when each return call is answered and automatically connecting the answered call to an available agent station in response to answer detection.

Still a another object is to provide the above method including the step of indicating to the agent station to which the recorded message is connected that an incoming call from the automatic call distributor is a recorded message.

A further object is to provide the above method in which said step of providing includes the steps of prompting the caller to orally provide his number as part of the recorded message and transmitting the orally recorded number to the agent station.

Yet another object is to provide the above method in which said step of providing includes the steps of automatically placing the call to the telephone number, detecting answering of the return call and connecting the return call to the agent in response to detection of an answer.

BRIEF DESCRIPTION OF THE DRAWING

The foregoing objects and advantageous features of the invention will be explained in greater detail and others will be made apparent from the detailed description of the preferred embodiment of the present invention which is given with reference to the several figures of the drawing, in which:

FIG. 1 is a functional block diagram of an automatic call distributor environment within which the automatic call return method of the invention is employed;

FIG. 2 is a functional block diagram of the automatic call distributor of FIG. 1;

FIG. 3 is a functional block diagram of the agent station blocks of FIG. 1;

FIG. 6 is a call flow diagram for the automatic call distributor method with a computer controlled auto dial.

DETAILED DESCRIPTION

Figure 4:
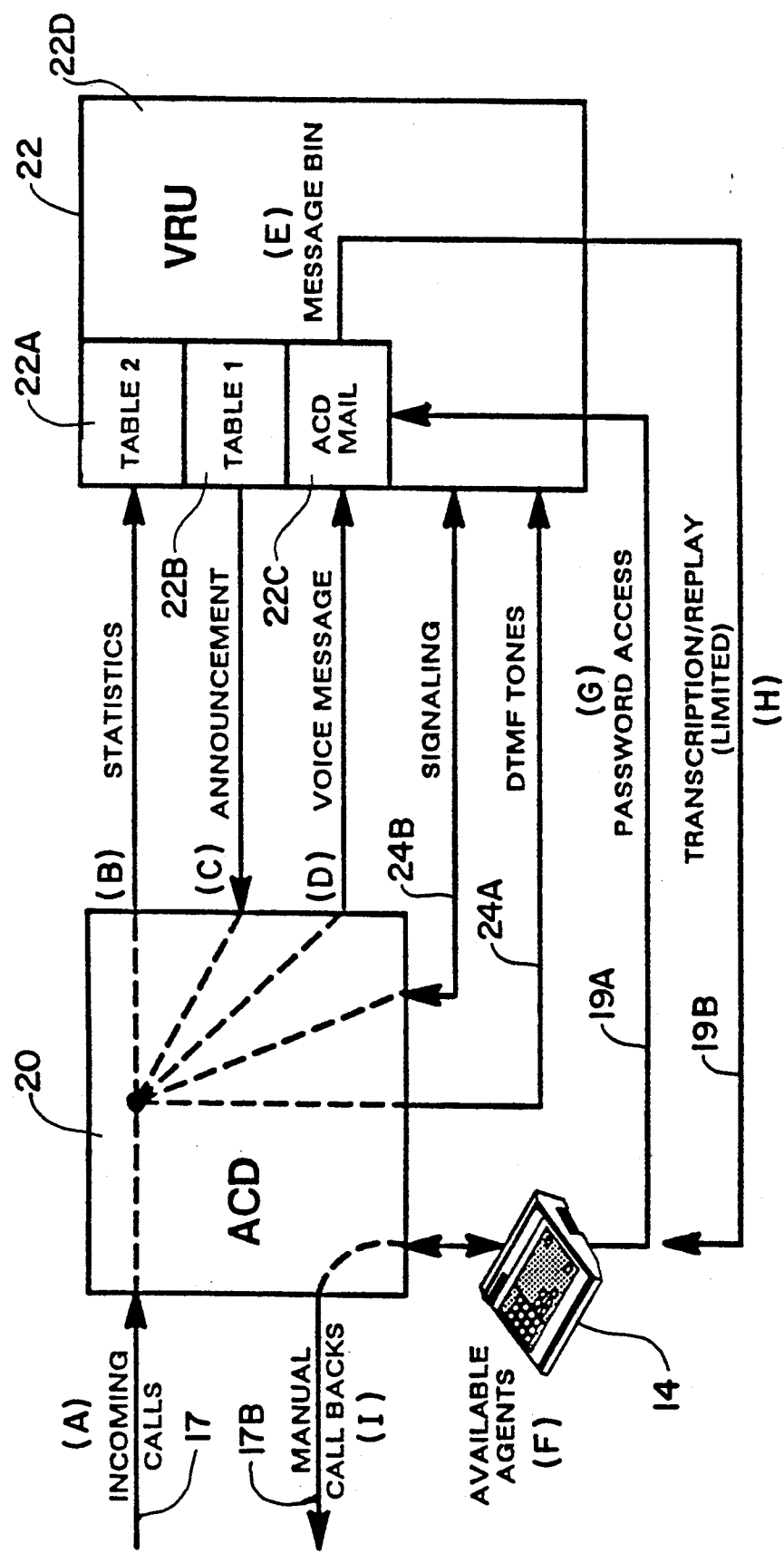
FIG. 4 is a call flow diagram for the automatic call distributor method with an auto message feature.

Referring now to FIG. 1, the automatic call return method of the present invention is used in conjunction with a conventional automatic call distribution system 10 which includes an automatic call distributor 12 and a plural number N of substantially identical agent stations 14. The call distribution system 10 is connected by suitable interface 17 through means of a conventional telephone switching network 16 to the individual telephones 18 of the calling public, or callers. The incoming calls are switched to the automatic call distributor 10 which automatically switches the calls through an interface 19 to the appropriate agent stations 14 which are not handling a current call and are otherwise available.

If no agent stations 14 are available, then selected announcements are provided to the caller by the automatic call distributor 10. The announcements provide the callers with queue information from which they can decide whether to continue to wait for an agent to respond to their call or to leave a recorded message for a return call. The caller is prompted to leave a voice message to be recorded including the caller's telephone number. The caller's number may be conveyed orally, but preferably it is conveyed to the recording medium via a touch-tone key pad entry from the caller's telephone set. Alternatively, the number of the caller is provided to the automatic call distributor 12 via an automatic number identification feature of the telephone switching network 16. The messages are stored in a queue and then automatically provided to agent stations 14 as they become available in the same way as an original incoming call.

While the method of the present invention can be employed with various types of ACD hardware, such as shown in the system described in the aforementioned U.S. Pat. No. 4,788,715 of Lee, preferably it is used in conjunction with the Galaxy* ACD System in combination with Galaxy Model 60 or Model 80 VRU (* Galaxy is a registered trademark of Rockwell International Corporation). Reference can be made to U.S. Pat. No. 4,881,261 of Oliphant et al. and to IQ/ueue Handbook 523-22-0052, Issue 1C, published Aug. 1990 by Rockwell International Corporation for details of the Galaxy* ACD System.

Briefly, referring to FIG., 2, the automatic call distributor 12 connected with the telephone switching network 16 by interface 17 includes an ACD control computer, or ACD unit, 20 and a voice response unit, or VRU, 22 connected with the ACD unit 20 through an interface 24. In the Galaxy system noted above, the ACD control computer is implemented with an IBM PS/2 Model 70 or 80 computer which has been appropriately programmed. The voice response unit 22 includes a table processing unit which responds to call statistic information determined by the ACD unit 20 to provide announcements to callers in the queue awaiting connection to selectively provide them with stored announcements relating to estimated waiting time or their position in the queue. It also contains an ACD mail memory for storing recorded messages from callers. An ACD gate 25 is controlled by the ACD unit 20 through an interface 26 to selectively connect incoming calls at interface 12 with the agent stations 14. In keeping with an object of the invention, the ACD gate also receives recorded messages from the voice response unit 22 on an interface 24 for selective connection to agent stations 14 as an incoming call. The ACD gate 25 is preferably the Galaxy* System ACD Gate as described in IQ/ueue Handbook, 523-22-0052, Issue 1C, published Aug. 1990 by Rockwell International Corporation.

Referring to FIG. 3, the agent stations include a telephone number display 28, a keyboard, or keypad, 30 for communicating with the automatic call distributor 12 and a telephone instrument 32, such as a telephone head set, for communication with the callers.

Returning to FIG. 2, the ACD gate 25 senses when one of the agent stations 14 is available to receive a recorded message and indicates this to the ACD control computer 20. The ACD control computer 20 then selects the first priority message in a queue of messages in a message recording means, or message bin, associated with an ACD voice mail program of the voice response unit 22. The selected first message is then caused to be automatically connected through the ACD gate 25 of the automatic call distributor 20 the same as an incoming call to the available agent station 14 or group of agent stations 14. Concurrently with the automatic connection of the recorded message to the selected available agent station 14 as an incoming call, an indication is provided to the agent station 14 that the incoming call is a recorded message. When an agent at the selected agent station 14 "answers" the incoming call with the recorded message, the recorded message is automatically played back, or transcribed, to the agent. A typical message may constitute an order for a product or service which had been advertised and provision of the callers credit card information, address for COD delivery or further information and the telephone number of the caller to facilitate a return call.

In keeping with one aspect of the invention, the automatic call distribution system 10 is provided with means for determining the caller's number, such as shown in IQ/ueue Handbook 523-22-0052, Issue 1C, published Aug. 1990 by Rockwell International Corporation, from DTMF keyboard inputs from the caller. In such event, voice prompts are provided to the caller by the VRU 22 and the caller provides the number inputs in response to recorded voice prompts along with the recorded voice message. The number of the caller is then obtained automatically from the recorded DTMF keypad entries recorded with the message. Alternatively, the telephone switching network 16 has an automatic number identification, or ANI, feature pursuant to which the callers number is automatically provided on interface 17 of the ACD control computer 20 which causes the ANI provided number to be recorded by an associated memory of the voice response unit 22.

Later, when the recorded message of the caller associated with the recorded number is automatically connected to the agent station 14, the number is obtained from memory, conveyed to the appropriate agent's station 14 and shown to the agent on the number display 28, FIG. 3. The automatically obtained number is then automatically provided to the agent station 14 in association with the recorded message automatically connected for automatic dialing of the number. In one mode of operation, the number is dialed automatically under control of the agent while in another mode of operation, the ACD control computer 20 automatically places the call without agent intervention.

Communications are two-way on interface 19 between the automatic call distributor 10 and the agent stations 14 and the ACD control computer 20 is programmed to selectively respond to signals from the agent stations 14 to perform several functions in accordance with the call return method. An agent station is enabled to receive a recorded message by first indicating to the agent station that a recorded message is available for transcription by the agent. However, the message is not automatically transmitted to the agent 14 from the voice responsive unit 22 until the agent, through use of keyboard 30, generates a password which is unique to each agent regardless of which agent station 14 at which the agent is located. These various password transmissions are stored by the ACD control computer 20 to determine agent performance statistics. Preferably, the password is generated by means of actuating a single key of the keyboard 30 at the agent station 14 to generate a single dual-tone signal. Alternatively, after the agent has logged in with the agent's password, subsequent messages are automatically conveyed to the agent without further action by the agent.

After an agent 14 has completed a return call, the recorded message is selectively erased in response to generation of a memory purge signal from the agent 14. Preferably, this purge signal results from actuation of a single keystroke at the keyboard 30 at the agent station 14 which causes generation of a simple dual-tone signal to the automatic call distributor 12. The automatic call distributor 12 then causes erasure of recorded message associated with the caller number being displayed when the purge signal is generated.

Alternatively, the automatic call distributor 12 causes the message to be erased automatically in response to initiation of a return call by the agent to the caller 18 who recorded the message. Initiation is selectively defined when a ring indicator is received or when the call is placed. Further increasing the efficiency of the system, the automatic call distributor 12 is programmed to automatically connect a call from a subsequent recorded message in the queue of recorded messages in response to automatic erasure of the prior message in the queue to achieve another object of the invention.

Another feature of the call return method is that the agent station 14 is automatically provided with the next number in the queue of recorded messages in response to generation of the memory purge signal. Preferably, when the agent enters his password, the call to the next number is automatically placed. Alternatively, the call is automatically placed directly in response to the memory purge signal, and the password is presumed the same until a new password is entered at that same agent station.

It is important to ascertain and store information concerning agent performance. Accordingly, another aspect of the invention is achieved by programming the automatic call distributor 12 to detect the identity of each agent station 14 which received a message and to determine if and when the agent at that agent station 14 made a return call attempt.

The ACD control computer is also programmed for operator preselection of a preselected limit on the number of attempted return calls from the agent stations 14 to a given caller who left a return message. When this preselected limit is reached, the ACD control connector 20 prevents automatic connection of the recorded message in the voice response unit 22 to the agent station 14. Preferably, the recorded message is erased after the preselected limit is reached, so that all agents are prevented from returning calls in response to the recorded message. Prior to the limit being reached, the recorded messages are recirculated in the queue when return calls are not completed.

More specifically, the ACD control computer 20 includes user selected steps of detecting when each return call is answered and automatically connecting the answered call to an available agent station 14 in response to answer detection. When it is detected that the return call is not answered, the message is returned to the queue for a subsequent automatic call return. In addition, the ACD control computer 20 includes means for printing information relating to the call, such as the number of the caller, the times and dates of the return calls, etc., when it is detected that a return call has not been completed within the preselected limit and is erased. In keeping with one aspect of the invention, the printed information is then used for nonautomated return of the calls.

Referring now to FIG. 4, a call flow diagram or flow chart for implementing the basic automatic call return method, or first mode of operation, of the present invention in a switching system having an ACD system illustrates the preferred sequence of steps. The different steps of the method are labelled in alphabetical order to indicate the preferred sequence. The ACD gate 25 has been deleted for purposes of simplicity, but it should be appreciated that communications between the VRU 22 and the agents 14 pass through this gate 25, FIG. 2, and interface 19.

As seen in FIG. 4, in the first step (A), incoming calls arrive on interface 17 at the ACD system 10. In the next step (B), incoming call statistics, such as the number of incoming calls in queue, are provided to a statistics table 22A associated with a microprocessor of VRU 22. The microprocessor of VRU, or VRU, 22 uses the incoming statistics received at statistics table 22A to correlate them with preselected announcements stored in an announcement table 22B.

In step (C) an appropriate voice announcement based on the correlation between tables 22A and 22B is provided to the ACD 12. The announcement is conveyed to the caller by the ACD 12 to inform the caller of either the caller's position in the queue or the estimated length of time before an agent can be expected to handle the call. In addition, an announcement is provided which gives the caller an option to leave a message and, if a return call is desired, to voice input the callers telephone number.

In step (D), if the caller so elects, a voice message is conveyed through the ACD 12 and, in step (E), is temporarily stored in a message bin memory 22D in accordance with an ACD mail program 22C of the VRU 22. The ACD 12 also conveys DTMF signals from the caller on a DTMF tones portion 24A of the interface 24, FIG. 2, to the VRU. Also two-way control communications between the ACD 12 and the VRU 22 are achieved on a signaling portion 24B of the interface 24 to coordinate the various functions being performed.

The various messages in the message bin 22D are stored in a preselected order in a queue of the message bin 22D, and in step (F), an available agent 14 is informed of an available message ready for transcription. In step (G), the available agent 14 provides the ACD mail processor portion 22C with the agent password access code on a portion 19A of the interface 19, and in step (H), the ACD mail processor portion 22C responds to the password to transcribe or replay the message to the agent station 14 on a portion 19B of the interface 19. The number of replays of the message is limited to a preselected maximum. Finally, in step (I) manual call backs are made by the agent at agent station 14 through the ACD 12 on a portion 17B of interface 17 in response to the transcribed voice message including the telephone number conveyed to the agent station 14. The agent listens to the telephone number in the voice message and then manually inputs all the digits of the number on his keypad 30 to place the outgoing call.

Figure 5:
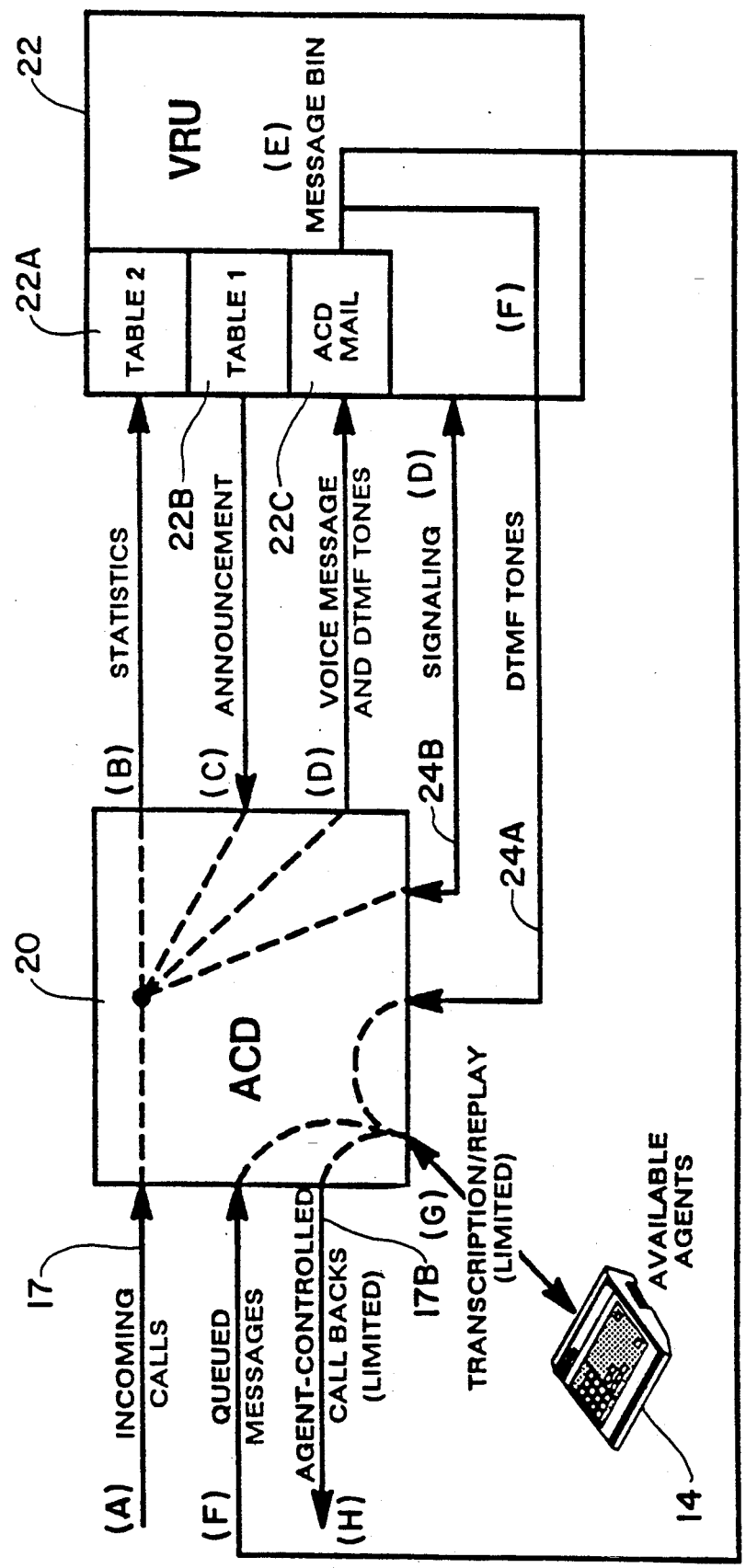
FIG. 5 is a call flow diagram for the automatic call distributor method with an agent controlled auto dial feature.

Referring now to FIG. 5, a call flow diagram for the automatic call return method of the present invention is shown which employs an agent controlled autodial feature or mode of operation. An autodial feature is a feature pursuant to which a multidigit telephone number is generated in response to a single keystroke. In accordance with the call return method, the number automatically provided to the agent station 14, and shown to the agent at least in the case of the operation shown in FIG. 4, is automatically dialed out to the telephone switching network 16 by the ACD 12 in response to a single keystroke at the agent station keyboard 30. The caller's telephone number is input by the caller 18 actuating the dual tone push buttons of his telephone which can be readily decoded into the callers telephone number with or without a recorded voice message or the number is received via an automatic number identification feature of the telephone switching network 16. As shown in FIG. 5, the first two steps (A) and (B) are the same as in the operational mode described with reference to FIG. 4.

Step (C) is the same, except unlike the situation in the auto message mode shown in FIG. 4 in which the callers telephone number is conveyed by voice only and thus cannot be readily automatically deciphered (thereby requiring the agent to dial the number one digit at a time), the announcement prompts the caller to input a return call number through use of the callers dual-tone push button telephone set or the number is obtained from automatic number identification. Thus, in step (D), the ACD 12 conveys to the ACD mail portion 22C of the VRU 22 both voice message and DTMF tones or ANI signals representing the callers telephone number. Also, in step (D) signalling on interface portion 24B between the ACD mail portion and the caller enable the caller to review the recorded message and also the push button telephone number and make corrections, if desired.

Accordingly, in step (E) both the DTMF tones are stored in the message bin in a queue. In step (F) both the queued voice messages and the corresponding DTMF tones are provided to the ACD 12. In step (G) the ACD unit 12, in response to a prompt from the agent, automatically transcribes the queued voice message to an available agent 14. Then, in response to a single keystroke of the agent, in step (H) the return call is automatically dialed. As indicated, the number of call backs by the agents in step (F) is limited to a preselected maximum number.

Turning now to FIG. 6, the call return method of the present invention when operating in a computer controlled mode of operation is illustrated. Steps (A), (B), (C), (D), (E) and (F) are substantially the same as described above with reference to the agent controlled operational mode illustrated in FIG. 5. In step (G), however, instead of the agent controlling the return calls, the ACD control computer 20 automatically makes the return calls. Then, in step (H), if there is no answer detection by the ACD 12 of the return call, the call is routed to an available agent 14 for response in substantially the same way as if it were an original incoming call, except an indication is provided to the agent station that this is a return call. In step (I), if there is no answer detection within a preselected time period after a limited number of call backs, information concerning the call is printed by a printer 32 controlled by the ACD for nonautomated call return and the message is purged. Prior to reading the printed list of call backs, if there is no answer detection, the message is relocated in the queue in a preselected priority order.

Thus, it is seen that a preferred embodiment of the call return method of the present invention is disclosed which achieves the objects of the invention as claimed above. However, it should be appreciated that this method could be implemented in types of equipment other than these disclosed. Also, variations may be made with respect to the best mode of practicing this invention without departing from the scope of the invention as set forth in the apended claims.

We claim:

1. In a call switching system having an automatic call distributor for selectively switching incoming calls from callers to a group of agent stations and with means for recording messages from the callers in the event a selected group of agent stations is not available to receive the incoming calls, a method for return of calls to callers who have recorded a message, comprising the steps of:

indicating to the automatic call distributor when an agent is available to receive a recorded message;

automatically connecting through the automatic call distributor, as an incoming call, a recorded message to the agent station indicated as available to receive a recorded message;

enabling an agent to transcribe the recorded message at the agent station; and providing the telephone number of the caller who left the recorded message to facilitate a return call.

2. The call return method of claim 1 including the step of erasing the message automatically in response to initiation of a return call by the agent to the caller who recorded the message.

3. The call return method of claim 2 in which the recorded messages are automatically placed in a queue, and including the step of automatically connecting a call from a subsequent caller in the queue in response to said step of automatically erasing a prior message in the queue.

4. The call return method of claim 1 including the step of automatically erasing the recorded message in response to actuation of a single keystroke of a key pad provided at the agent station to generate a preselected dual-tone signal.

5. The call return method of claim 1 in which said step of enabling the agent station to receive the recorded message includes the steps of indicating to the agent station that a recorded message is available for transcription by the agent, and automatically transmitting the message to the agent in response to generation of a password unique to the agent.

6. The call return method of claim 5 in which said step of generating the password includes the step of actuating a single keystroke of a keyboard at the agent station to generate a single duel-tone signal.

7. The call return method of claim 5 including the step of automatically erasing the recorded message in response to generation of a memory purge signal.

8. The call return method of claim 7 in which said step of automatically erasing the recorded message includes the step of actuating a single keystroke of a keypad to generate a single dual-tone signal.

9. The call return method of claim 7 in which recorded messages are automatically placed in a queue, and including the step of placing a call to a subsequent caller in the queue automatically in response to generation of the memory purge signal.

10. The call return method of claim 7 in which recorded messages are automatically placed in a queue and including the step of detecting the identity of each agent station which received a message, and determining if and when said agent placed a return call attempt.

11. The call return method of claim 1 including the steps of determining the caller's number from DTMF keypad inputs form the caller and recorded with the message through means of the automatic call distributor obtaining the telephone number of the recorded DTMF keypad entries recorded with the message, and displaying the obtained number at the agent station when the associated recorded message is automatically connected to the agent station.

12. The call return method of claim 1 in which said call switching system has means for automatically identifying the number of callers and said step of providing includes the steps of recording the number determined by the automatic number identifying means for the recorded message, obtaining the telephone number of the recorded message determined by the automatic number identifying means, and automatically using the obtained telephone number to place a return call at the agent station when the associated recorded message is automatically connected to the agent station.

13. The call return method of claim 1 including the steps of establishing a user selected preselected limit on the number of attempted return calls from the agent stations to a given caller who left a return message, and preventing performance of said step of automatically connecting a recorded message to the agent station when said preselected limit is reached.

14. The call return method of claim 13 in which said step of preventing selectively includes the step of erasing said recorded message after said user selected preselected limit is reached.

15. The call return method of claim 1 in which said step of automatically connecting includes at least one of the user selected steps of loading all the recorded messages in a memory in a queue for creating a return call campaign, placing a return call to each caller who left a recorded message in a preselected order, detecting when each return call is answered, and automatically connecting the answered call to an available agent station in response to answer detection.

16. The call return method of claim 15 including the steps of detecting when a return call is not answered, and returning the message to the queue of recorded messages at another location in the queue for a subsequent automatic return call attempt.

17. The call return method of claim 15 including the steps of detecting when a return call is not answered, and printing information relating to the call in response to detecting that a call has not been answered.

18. The call return method of claim 17 including the step of utilizing the printed information for nonautomated return of the calls which have not been answered.

19. The call return method of claim 1 in which said step of automatically connecting includes the steps of placing a return call to each caller who left a recorded message in a preselected order, detecting when each return call is answered, and automatically connecting the answered call to an available agent station in response to answer detection.

20. The call return method of claim 19 including the steps of detecting when a return call is not answered, and returning the message to the queue of recorded messages at another location in the queue for a subsequent automatic return call attempt.

21. The call return method of claim 19 including the steps of detecting when a return call is not answered, and printing information relating to the call in response to detecting that a call has not been answered.

22. The method of claim 1 including the step of indicating to the agent station to which the recorded message is connected that an incoming call from the automatic call distributor is a recorded message.

23. The method of claim 1 in which said step of providing includes the steps of prompting the caller to orally provide his number as part of the recorded message; and transmitting the orally recorded number to the agent station selection for the return call.

24. The method of claim 1 in which said step of providing includes the steps of automatically placing the call to the telephone number, detecting answering of the return call, and connecting the return call to the agent in response to detection of an answer.

* * * * *